(12) United States Patent
Shen et al.

(10) Patent No.: US 10,924,008 B2
(45) Date of Patent: Feb. 16, 2021

(54) DEVICES, SYSTEMS, AND METHODS FOR CHARGING ELECTRIC VEHICLES

(71) Applicant: NIO USA, Inc., San Jose, CA (US)

(72) Inventors: Miaosen Shen, Fremont, CA (US); Feng Guo, Santa Clara, CA (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 16/506,581

(22) Filed: Jul. 9, 2019

(65) Prior Publication Data

US 2021/0013802 A1     Jan. 14, 2021

(51) Int. Cl.
*H02M 3/155* (2006.01)
*H02M 3/07* (2006.01)
*H02J 7/00* (2006.01)

(52) U.S. Cl.
CPC .......... *H02M 3/155* (2013.01); *H02J 7/00* (2013.01); *H02M 3/07* (2013.01); *H02J 2207/20* (2020.01)

(58) Field of Classification Search
None
See application file for complete search history.

(56) References Cited

U.S. PATENT DOCUMENTS

| | | |
|---|---|---|
| 5,710,504 A | 1/1998 | Pascual et al. |
| 6,256,215 B1 | 7/2001 | Barrett et al. |
| 7,612,603 B1 | 11/2009 | Petricek et al. |
| 7,821,244 B1 | 10/2010 | Signoretti et al. |
| 7,948,221 B2 | 5/2011 | Watanabe et al. |
| 9,327,658 B2 | 5/2016 | Watanabe et al. |
| 9,381,824 B2 | 7/2016 | Tabatowski-Bush |
| 9,438,115 B2 | 9/2016 | Ishigaki et al. |
| 9,660,521 B2 | 5/2017 | Oi et al. |
| 9,722,493 B1 | 8/2017 | Sheron et al. |
| 9,825,556 B2 | 11/2017 | Rodriguez |
| 9,893,617 B2 | 2/2018 | Ide |
| 9,902,270 B2 | 2/2018 | Hashimoto |
| 1,036,382 A1 | 7/2019 | Shen et al. |
| 1,062,562 A1 | 4/2020 | Shen et al. |
| 1,063,286 A1 | 4/2020 | Shen et al. |
| 2007/0296383 A1 | 12/2007 | Xu et al. |

(Continued)

OTHER PUBLICATIONS

Official Action for U.S. Appl. No. 15/825,888, dated Apr. 4, 2019, 11 pages.

(Continued)

*Primary Examiner* — Jeffrey A Gblende
(74) *Attorney, Agent, or Firm* — Sheridan Ross P.C.

(57) ABSTRACT

A converter includes a plurality of switching elements coupled between power signal lines that receive a first voltage from an external power source. The converter includes at least one capacitance, and at least one connector including a first port coupled to the first battery and a first power signal line of the power signal lines, a second port coupled to the second battery and a second power signal line of the power signal lines, and a third port coupled to an output line. The output line is coupled between the first battery and the second battery. The converter includes a resonant circuit coupled to the plurality of switching elements. During a charging mode, the plurality of switching elements, the resonant circuit and the at least one capacitance operate to balance voltages of the first battery and the second battery through the first, second, and third ports.

20 Claims, 10 Drawing Sheets

(56) References Cited

U.S. PATENT DOCUMENTS

| | | |
|---|---|---|
| 2008/0169785 A1 | 7/2008 | Kim |
| 2010/0080023 A1 | 4/2010 | Jain |
| 2011/0292690 A1 | 12/2011 | Liang et al. |
| 2012/0049834 A1 | 3/2012 | Pommerenke et al. |
| 2012/0154013 A1 | 6/2012 | Mera et al. |
| 2014/0042977 A1* | 2/2014 | Kim ............ H02J 7/0016 320/134 |
| 2014/0043032 A1 | 2/2014 | Makino et al. |
| 2014/0265605 A1 | 9/2014 | Ishigaki et al. |
| 2014/0268946 A1 | 9/2014 | Liu |
| 2015/0078053 A1 | 3/2015 | Harrison et al. |
| 2016/0020621 A1 | 1/2016 | Baby et al. |
| 2016/0079751 A1 | 3/2016 | Ide et al. |
| 2016/0111881 A1 | 4/2016 | Ide et al. |
| 2016/0134148 A1 | 5/2016 | Ide et al. |
| 2016/0181865 A1 | 6/2016 | Hu et al. |
| 2016/0233776 A1 | 8/2016 | Nielsen |
| 2017/0085125 A1* | 3/2017 | Ghosh ............ H02M 1/32 |
| 2017/0110893 A1* | 4/2017 | Cao ............ H02J 7/0019 |
| 2017/0110894 A1* | 4/2017 | Gotz ............ B60L 58/12 |
| 2017/0279287 A1 | 9/2017 | Solodovnik et al. |
| 2018/0219546 A1 | 8/2018 | Yang et al. |
| 2018/0323707 A1 | 11/2018 | Yuyama et al. |
| 2019/0023149 A1 | 1/2019 | Chen et al. |
| 2020/0052524 A1* | 2/2020 | Mergener ............ H02J 7/0021 |

OTHER PUBLICATIONS

Final Action for U.S. Appl. No. 15/825,888, dated Aug. 23, 2019, 8 pages.

Notice of Allowance for U.S. Appl. No. 15/825,888, dated Dec. 27, 2019, 10 pages.

Notice of Allowance for U.S. Appl. No. 16/005,808, dated Mar. 6, 2019, 16 pages.

Notice of Allowance for U.S. Appl. No. 16/521,296, dated Jan. 6, 2020, 17 pages.

U.S. Appl. No. 15/825,888, filed Nov. 29, 2017 now U.S. Pat. No. 10,625,626.

U.S. Appl. No. 16/005,808, filed Jun. 12, 2018 now U.S. Pat. No. 10,363,828.

U.S. Appl. No. 16/521,296, filed Jul. 24, 2019 now U.S. Pat. No. 10,632,863.

* cited by examiner

DEVICES, SYSTEMS, AND METHODS FOR CHARGING ELECTRIC VEHICLES

FIELD

The present disclosure is generally directed to vehicle devices, systems, and methods, and more particularly to charging devices, systems, and methods for vehicles.

BACKGROUND

Most vehicles, in particular electric and hybrid vehicles, include power systems usually referred to as battery systems that provide power to, monitor, and control the operation of the vehicles. For example, the battery system of an electric vehicle acts as a power source for the vehicle's powertrain as well as auxiliary components or features, such as heating and cooling components, dashboard electronics, etc. As the industry continues to develop, additional/alternative power systems are desired to support vehicle applications where higher voltage, e.g., 800V, becomes increasingly attractive to reduce battery charging time, for example.

DETAILED DESCRIPTION

Embodiments of the present disclosure will be described in connection with a vehicle, and more particularly with respect to an automobile. However, for the avoidance of doubt, the present disclosure encompasses the use of the aspects described herein in vehicles other than automobiles.

To power up all the thermal components as well as auxiliary load of a vehicle while vehicle is using an 800V DC fast charge system, a DCDC converter is needed. A conventional DCDC converter for this application is expensive with heavy and big inductive components.

A switched capacitor topology provides the benefits of low cost, low volume, and low weight when it is used to replace the conventional DCDC converter. Here, it may be desired for the switch capacitor topology to regulate the output voltage to a desired value in order improve the performance of the topology. In addition, with control strategies according to example embodiments, the SC topology can precisely balance the two battery packs connected in series during 800V DC fast charge, which provides additional benefit to the electric vehicle.

Example embodiments provide 800V DCDC fast charging becomes for a 400V powertrain system. A DCDC converter according to example embodiments can provide a 400V output from an 800V input to power all the powertrain components during 800V DC fast charging. A switched capacitor topology can be used in this 800V DC fast charging system, and with the proposed control strategy, the output voltage of the SC topology can be regulated, which improves its performance. If two battery packs are in series, this SC topology can help to balance the two battery pack voltages.

A switched topology for 800V DC fast charging includes a resonant tank with an inductor and a capacitor, four power switches, and two DC link capacitors.

In at least one example embodiment, a single high voltage (HV) cable harness with three cables is used to connect the batteries to a three port HV connector. Therefore, the proposed topology may employ a fewer number of HV cables than related art systems.

Among the three cables in the HV cable harness used in the proposed topology, only the cables connected to two ports are rated at an input current $I_{in}$ (e.g., an input current of the power source that charges the batteries) while the cable connected to the other port is rated at $2*I_{in}$. Therefore, the proposed topology may reduce the number of high current cables compared to related art designs.

With the aforementioned improvements, the proposed circuit topology can help further reduce the cost and/or footprint, and improve the power density of the topology for an electric vehicle fast charge system.

Figure 1:
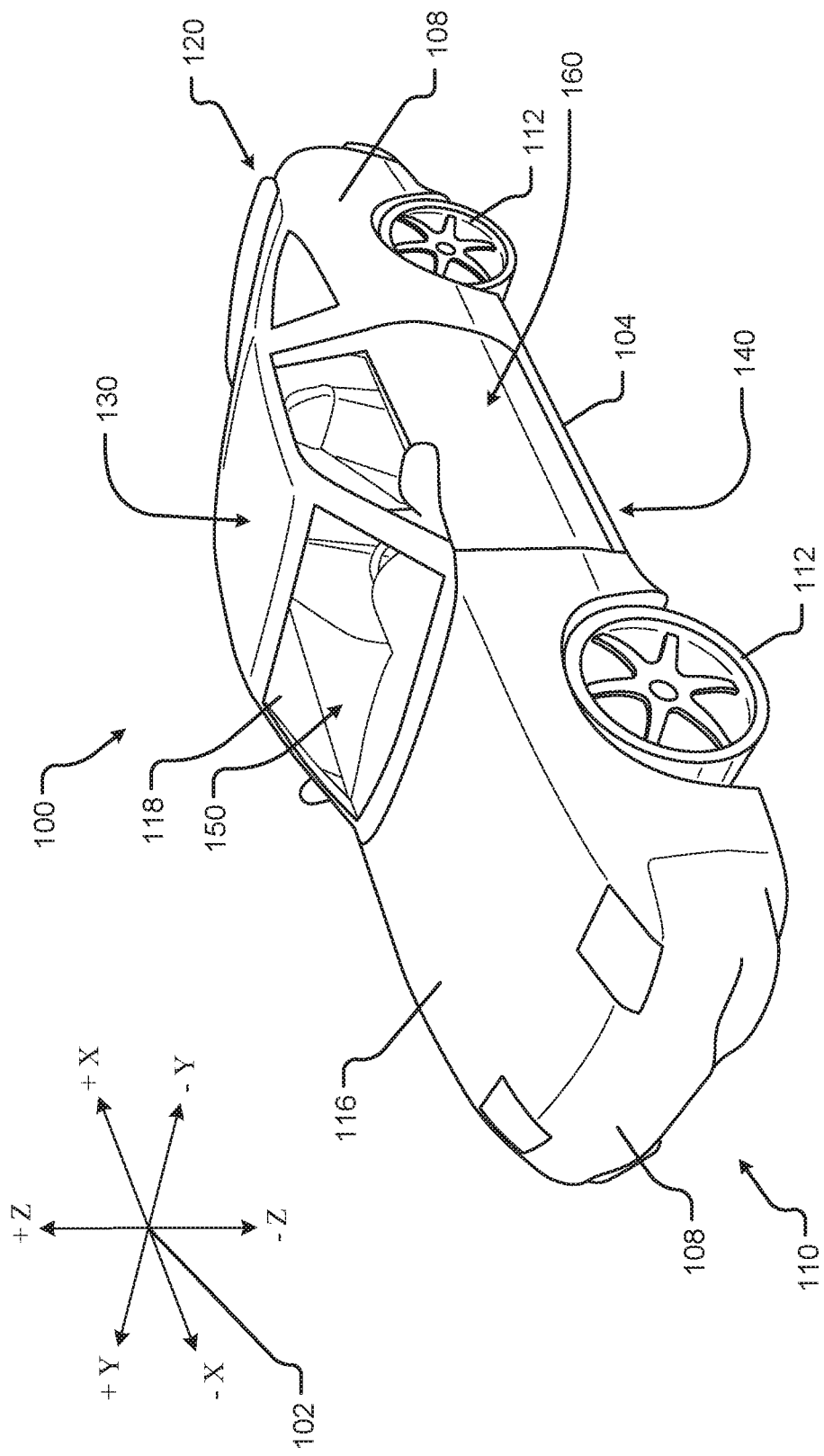
FIG. 1 shows a perspective view of a vehicle (or electric vehicle) in accordance with at least one example embodiment.

FIG. 1 shows a perspective view of a vehicle (or electric vehicle) 100 in accordance with example embodiments. The vehicle 100 comprises a vehicle front 110, vehicle aft 120, vehicle roof 130, at least one vehicle side 160, a vehicle undercarriage 140, and a vehicle interior 150. The vehicle 100 may include a frame 104, one or more body panels 108 mounted or affixed thereto, and a windshield 118. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Coordinate system 102 is provided for added clarity in referencing relative locations in the vehicle 100. In this detailed description, an object is forward of another object or component if the object is located in the -X direction relative to the other object or component. Conversely, an object is rearward of another object or component if the object is located in the +X direction relative to the other object or component.

The vehicle 100 may be, by way of example only, a battery electric vehicle (BEV) or a hybrid electric vehicle (HEV). Where the vehicle 100 is BEV, the vehicle 100 may comprise one or more electric motors powered by electricity from an on-board battery pack. The electric motors may, for example, be mounted near or adjacent an axis or axle of each wheel 112 of the vehicle, and the battery pack may be mounted on the vehicle undercarriage 140. In such embodiments, the front compartment of the vehicle, referring to the space located under the vehicle hood 116, may be a storage or trunk space. Where the vehicle 100 is an HEV, the vehicle 100 may comprise the above described elements of a BEV with the addition of a gas-powered (or diesel-powered) engine and associated components in the front compartment (under the vehicle hood 116), which engine may be configured to drive either or both of the front wheels 112 and the rear wheels 112. In some embodiments where the vehicle 100 is an HEV, the gas-powered engine and associated components may be located in a rear compartment of the vehicle 100, leaving the front compartment available for storage or trunk space or for other uses. In some embodiments, the vehicle 100 may be, in addition to a BEV and an HEV, a fuel cell vehicle.

Although shown in the form of a car, it should be appreciated that the vehicle 100 described herein may include any conveyance or model of a conveyance, where the conveyance was designed for the purpose of moving one or more tangible objects, such as people, animals, cargo, and the like. Typical vehicles may include but are in no way limited to cars, trucks, motorcycles, buses, automobiles, trains, railed conveyances, boats, ships, marine conveyances, submarine conveyances, airplanes, space craft, flying machines, human-powered conveyances, and the like.

The vehicle 100 may be capable of autonomous operation, wherein one or more processors receive information from various sensors around the vehicle and use that information to control the speed and direction of the vehicle 100 so as to avoid hitting obstacles and to navigate safely from an origin to a destination. In such embodiments, a steering wheel is unnecessary, as the one or more processors, rather than a vehicle occupant, control the steering of the vehicle 100.

Figure 2:
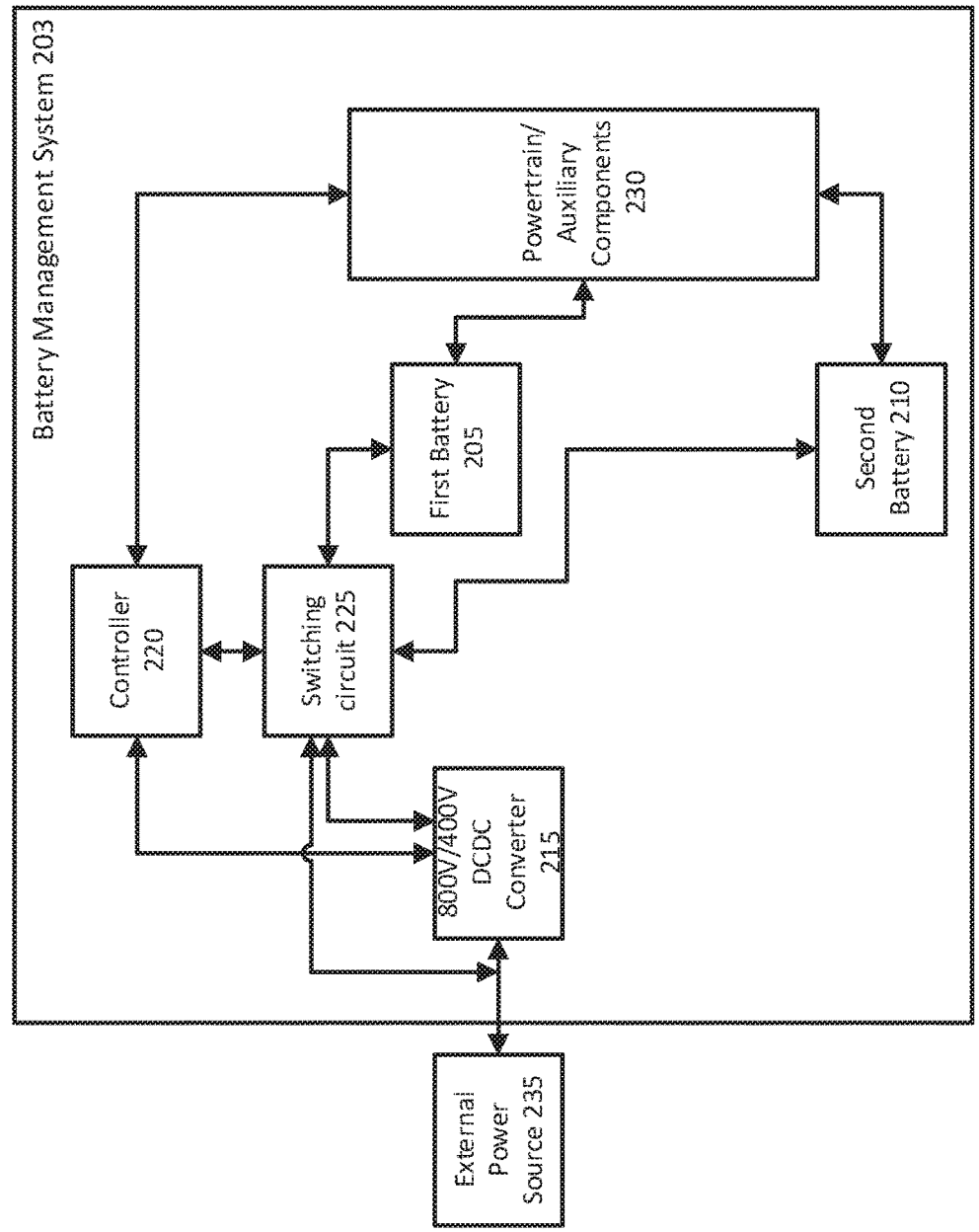
FIG. 2 is an example schematic of a power system of the electric vehicle in accordance with at least one example embodiment.

FIG. 2 is an example schematic of a power system 200 for the electric vehicle 100 in accordance with at least one example embodiment. The power system 200 includes an external power source 235 and a Battery Management System (BMS) 203 that acts as a main power source to overall operation of electric motor(s) and other components within the vehicle 100. The external power source 235 may be a charging station for the vehicle 100 or some other voltage source capable of charging the vehicle 100. The external power source 235 may have a first voltage, for example, 800V that is used for charging the batteries 205/210. The batteries 205/210 may have a nominal voltage that is less than the first voltage, for example, 400V.

As shown in FIG. 2, the BMS 203 includes a first battery 205, a second battery 210, a voltage converter 215 (e.g., 10-20 kW), a controller 220, a switching circuit 225, a powertrain and auxiliary components 230, and an external power source (or charger or DC fast charger (DCFC)) 235. The powertrain may include a desired number of inverters (e.g., two inverters) to drive corresponding electric motors (e.g., two motors) to power the vehicle 100. The auxiliary components may include various loads other than the inverters/electric motors, such as other DCDC converters, compressors, panel instruments, etc.

The controller 220 controls operation of the BMS 203. The controller 220 may comprise software, hardware, or a combination thereof. For example, the controller 220 may include a memory including executable instructions and a processor (e.g., a microprocessor) that executes the instructions on the memory. Additionally or alternatively, the controller 220 may comprise hardware, such as an application specific integrated circuit (ASIC). The controller 220 is coupled to the powertrain/auxiliary components 230, the converter 215, the switching circuit 225, and the batteries 205/210 (through the switching circuit 225). The controller 220 controls a switching frequency or switching sequence of a plurality of switching elements 310, 315, 320, 325 (see FIG. 3) in the converter 215 to match the resonant frequency such that the converter 215 converts a first voltage (e.g., 800V) into a second voltage (e.g., 400V) to support auxiliary components 230, and to balance the first battery 205 and the second battery 210 (the converter 215 is discussed in more detail below with reference to FIG. 3). For example, the converter 215 automatically balances the batteries 205/210 by keeping the voltages of the first and second batteries 205/210 equal to or within a desired threshold amount of one another during charging. That is, since the powertrain/auxiliary components 230 are connected to the second battery 210, the voltage of the second battery 210 may be different from the voltage of the first battery 205 if the converter 215. Thus, the converter 215 operates to keep these voltages balanced during charging, for example. In at least one embodiment, the converter 215 does not operate, for example, if the batteries 205/210 are balanced and the auxiliary components 230 are not consuming any power. However, in most cases, the converter 215 is in operation to keep the batteries balanced because the auxiliary components 230 are connected to second battery 210 and draining energy from the second battery 210. In at least one example embodiment, the switching frequency/resonant frequency is about 50 kHz. However, the switching frequency/resonant frequency may vary based on design preferences.

The switching circuit 225 may include one or more switches that the controller 220 turns on and off to control electrical connections to the first battery 205, the second battery 210, the converter 215, and the powertrain/auxiliary components 230. For example, in a driving mode of the vehicle 100, the controller 220 may control the switching circuit 225 such that the first battery 205 and the second battery 210 are connected in parallel to provide power to the powertrain and auxiliary components 230 at a particular voltage (e.g., 400V). As another example, in a charging mode, the controller 220 may control the switching circuit 225 such that the first battery 205 and the second battery 210 are connected in series and connected to the external power source 235 to charge the batteries 205/210 with a particular voltage (e.g., 800V). The number of switches and their configuration in the switching circuit 225 may be design parameters set based on empirical evidence and/or design preferences.

FIG. 2 illustrates that batteries 205 and 210 are separate battery packs. However, it should be further understood that the first battery 205 and the second battery 210 may be a single battery pack tapped at locations that effectively split the single battery pack into two batteries.

The converter 215 may be a voltage converter that converts the first voltage (e.g., 800V from the external power source 235) to a second voltage (e.g., 400V) that is less than the first voltage to power the powertrain/auxiliary components 230, for example, while the vehicle 100 is charging during a charging mode. The voltage converter 215 may be a direct current (DC) to direct current converter (DCDC). In a driving mode of the vehicle 100, the voltage converter 215 is disconnected from the external power source 235 and may be bypassed by the controller 220 to effectively remove the converter 215 from the BMS 203. The voltage converter 215 is described in more detail below with reference to FIG. 3.

Figure 3:
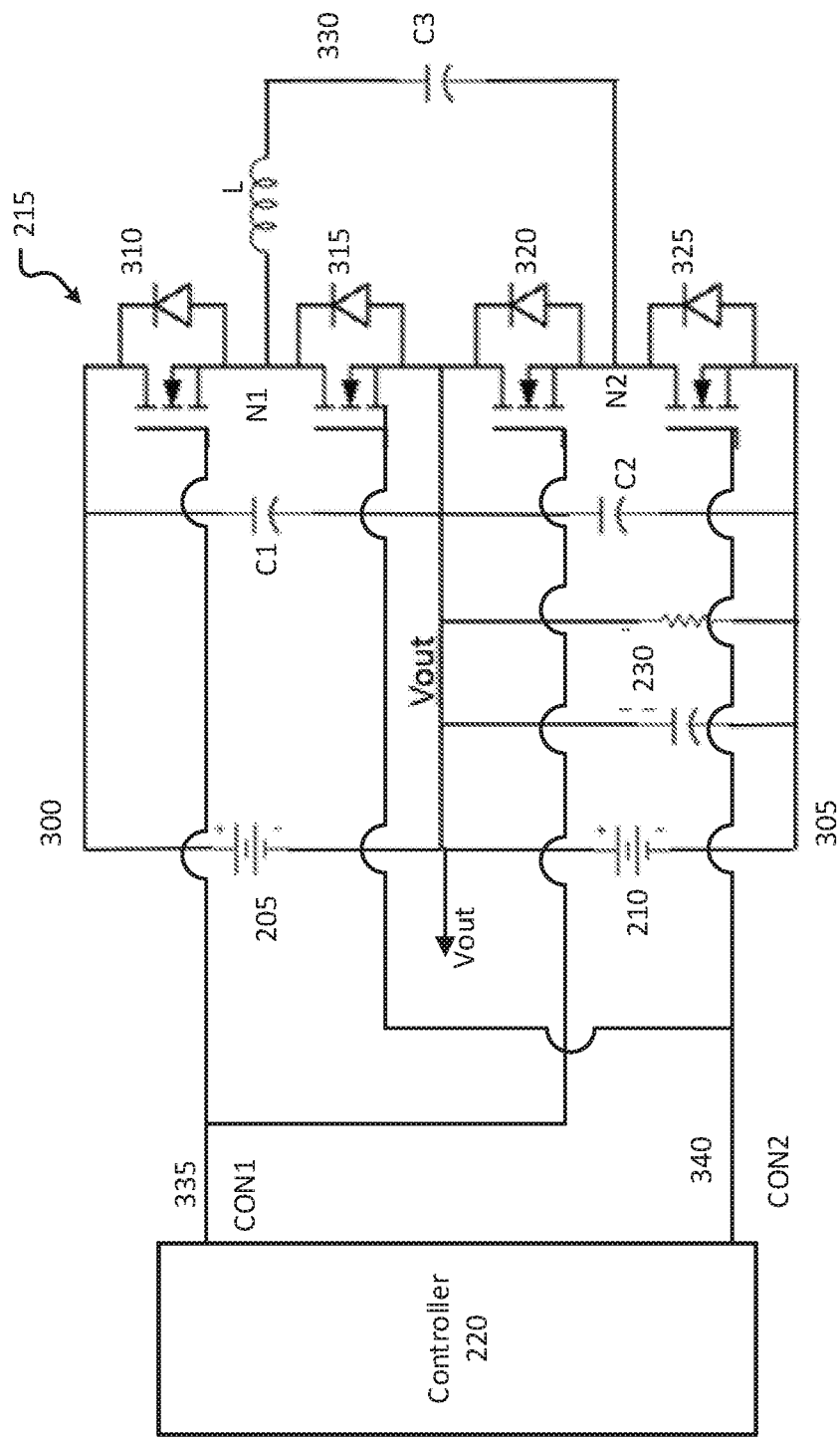
FIG. 3 illustrates an example of the converter of FIG. 2 in accordance with at least one example embodiment.

FIG. 3 illustrates the voltage converter (or converter) 215 and other elements from FIG. 2 according to at least one example embodiment. The converter 215 may be referred to as having a switched capacitor topology.

The converter 215 includes a plurality of switching elements 310, 315, 320, and 325 connected in series and coupled between power signal lines 300/305 that receive a first voltage (e.g., 800V) from an external power source 235. The converter 215 includes at least one capacitance coupled between the power signal lines 300/305. The at least one capacitance may serve to smooth the signal at the output line Vout (also referred to as an output voltage Vout). In FIG. 3, the at least one capacitance includes two capacitances (e.g., two DC link capacitors) C1 and C2 coupled to the plurality of switching elements 310, 315, 320, and 325, the first battery 205 and the second battery 210. The converter 215 includes a resonant circuit 330 coupled to the plurality of switching elements 310, 315, 320, and 325. A switching frequency of the plurality of switching elements 310, 315, 320, and 325 is matched to a resonant frequency of the resonant circuit 330 such that, during a charging mode, the plurality of switching elements 310, 315, 320, and 325, the resonant circuit 330 and the at least one capacitance operate to convert the first voltage into a second voltage (e.g., 400V) that supports auxiliary components 230, and balance the first battery 205 and the second battery 210. That is, the first voltage is greater than the second voltage.

As shown in FIG. 3, the at least one capacitance includes a first capacitance C1 and a second capacitance C2. The plurality of switching elements includes a first switching element 310 and a second switching element 315 connected in parallel with the first capacitance C1. The plurality of switching elements includes a third switching element 320 and fourth switching element 325 connected in parallel with the second capacitance C2.

In FIG. 3, the plurality of switching elements 310, 315, 320, and 325 are power transistors, such as power metal-oxide-semiconductor field effect transistors (MOSFETs) or insulated gate bipolar transistors (IGBTs). However, example embodiments are not limited thereto and any suitable switching devices may be employed as the switching elements 310, 315, 320, and 325.

The resonant circuit 330 is coupled between a first node N1 and a second node N2. As shown, the first node N1 is between the first switching element 310 and the second switching element 315, and the second node N2 is between the third switching element 320 and the fourth switching element 325. The resonant circuit 330 may be an LC circuit that includes an inductance L connected in series with a third capacitance C3. As noted above, values of C1, C2, C3, and L are selected such that a resonant frequency of the resonant circuit 330 is matched to a switching frequency of the plurality of switching elements 310, 315, 320, and 325, where the switching frequency is controlled by the controller 220 during the charging mode (discussed in more detail below). That is, C1, C2, C3, and L are design parameters set based on empirical evidence and/or design preferences. Capacitances C1, C2, C3 may be implemented by capacitors or any other suitable means for achieving desired capacitance values. The inductance L may be implemented by an inductor or any other suitable means for achieving a desired inductance value.

The first switching element 310 and the third switching element 320 are coupled to a first control signal line 335 that receives a first control signal CON1 (e.g., from the controller 220) to control switching of the first and third switching elements 310/320. The second switching element 315 and the fourth switching element 325 are coupled to a second control signal line 340 that receives a second control signal CON2 (e.g., from the controller 220) to control switching of the second and fourth switching elements 315/325.

As shown in FIG. 3, the first battery 205 is coupled between an output line Vout and a first power signal line 300 of the power signal lines. The output line Vout outputs the second voltage (e.g., 400V). The first power signal line 300 is coupled to a positive terminal of the external power source 235. The second battery 210 is coupled between the output line Vout and a second power signal line 305 of the power signal lines. The second power signal line 305 is coupled to a negative terminal of the external power source 235.

The first and second switching elements 310/315 are coupled between the first power signal line 300 and the output line Vout, and the third and fourth switching elements 320/325 are coupled between the output line Vout and the second power signal line 305. The first capacitance C1 is coupled between the first power signal line 300 and the output line Vout so as to be in parallel with the first and second switching elements 310/315. The second capacitance C2 is coupled between the second power signal line 305 and the output line Vout so as to be in parallel with the third and fourth switching elements 320/325.

As shown in FIG. 3, the powertrain/auxiliary components 230 are a load on the second battery 210, where the powertrain/auxiliary components 230 are represented by a resistance and a capacitance. Additionally or alternatively, it should be understood that the powertrain/auxiliary components 230 may be a load on the first battery 205 if desired without departing from the scope of example embodiments.

During a charging mode of the vehicle 100 in which the batteries 205/210 are being charged, the controller 220 controls the switching frequency of the plurality of switching elements 310, 315, 320, and 325 via the first and second signal control lines 335/340 connected to gates of the plurality of switching elements 310, 315, 320, and 325. In more detail, the controller 220 controls first and third switching elements 310/320 to be ON during a first time period and OFF during a second time period. The controller 220 controls the second and fourth switching elements 315/325 to be OFF during the first time period and ON during the second time period. The above described timing is discussed in more detail below with reference to FIG. 4.

Controlling the switching frequencies of the plurality of switching elements 310, 315, 320, and 325 to match the resonant frequency of the resonant circuit 230 effectively/efficiently converts the first voltage from the external power source 235 into a second voltage to support auxiliary components 230, and balance the first battery 205 and the second battery 210. When the switching frequency does not match the resonant frequency, the controller 220 adjusts the switching frequency based on feedback from the converter 215. Here, the resonant frequency may be a value known by the controller 220 (e.g., as a result of manufacturing input) or measured by the controller 220 prior to the charging mode (e.g., by conducting tests that solve values for L and C3 in FIG. 3). The feedback may be in the form of the controller 220 monitoring the current through the resonant inductor L at switching transients of the plurality of switching elements 310, 315, 320, and 325 to determine whether the current through the inductor L is within a threshold range. The threshold range may be a design parameter set based on empirical evidence and/or design preference. In at least one example embodiment, the threshold range includes 0A or about 0A. For example, the threshold range may be −100 mA to 100 mA. In the event that the current is outside the threshold range, the controller 220 adjusts switching frequency of the plurality of switching elements 310, 315, 320, and 325 by changing the first and second time periods accordingly.

Figure 4:
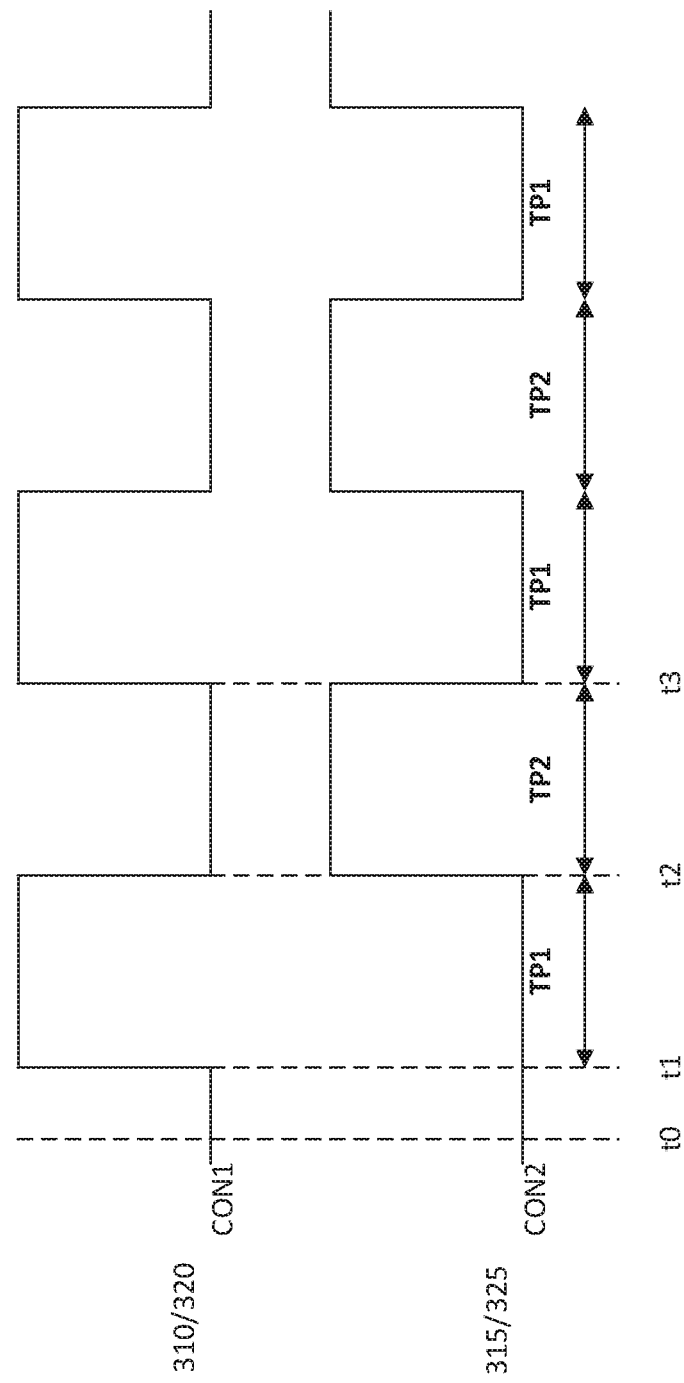
FIG. 4 is a timing diagram for controlling the switching of the plurality of switching elements in FIG. 3 in accordance with at least one example embodiment.

FIG. 4 illustrates a timing diagram for controlling the switching of the plurality of switching elements 310, 315, 320, and 325 in FIG. 3. FIG. 4 illustrates ON/OFF states for the pairs of switching elements 310/320 and 315/325.

At or before time t0, the vehicle 100 enters a charging mode in which the batteries 205/210 are to be charged with power from the external power source 235. Initially, at time t0, all of the plurality of switching elements 310, 315, 320, and 325 are OFF.

At time t1, the controller 220, via the first control signal CON1 through the first control signal line 335, turns ON switching elements 310 and 320 for a first time period TP1. The controller 220, via the second control signal CON2 through the second control signal line 240, ensures that switching elements 315 and 325 remain OFF for the first time period TP1.

At time t2, the first control signal CON1 turns OFF switching elements 310 and 320 while the second control signal CON2 turns ON switching elements 315 and 325 for the second time period TP2.

At time t3, the first control signal CON1 turns ON switching elements 310 and 320 while the second control signal CON2 turns OFF switching elements 315 and 325 for another first time period TP1. This switching sequence occurs for the duration of the charging mode.

In view of FIG. 4, it may be said that the first time period TP1 and the second time period TP2 alternate. That is, the controller 220 controls the plurality of switching elements for the first time period TP1 and then the second time period TP2, and repeats this process throughout charging. As shown in FIG. 4, the first time period TP1 and the second time period TP2 may have equal durations (i.e., the pair of the first and third switching elements 310/320 has an identical duty cycle to the pair of the second and fourth switching elements 315/325). The first time period TP1 and the second time period TP2 may have different durations, if desired. However, different durations may lead to conversion inefficiencies. The switching frequency of the pairs of switching elements 310/320 and 315/325 is controlled to match the resonant frequency of the resonant circuit 330 in order to convert the voltage from the external power source 235 into a voltage that supports auxiliary components 230, and that balances the first battery 205 and the second battery 210. In this manner, the converter 215 may accomplish fast charging that automatically balances battery voltages for batteries 205/210 during charging. That is, power from the external power source 235 is distributed to the first and second batteries 205/210 in a manner that ensures the batteries charge evenly regardless of which battery has the load of the powertrain/auxiliary components 230.

Figure 5:
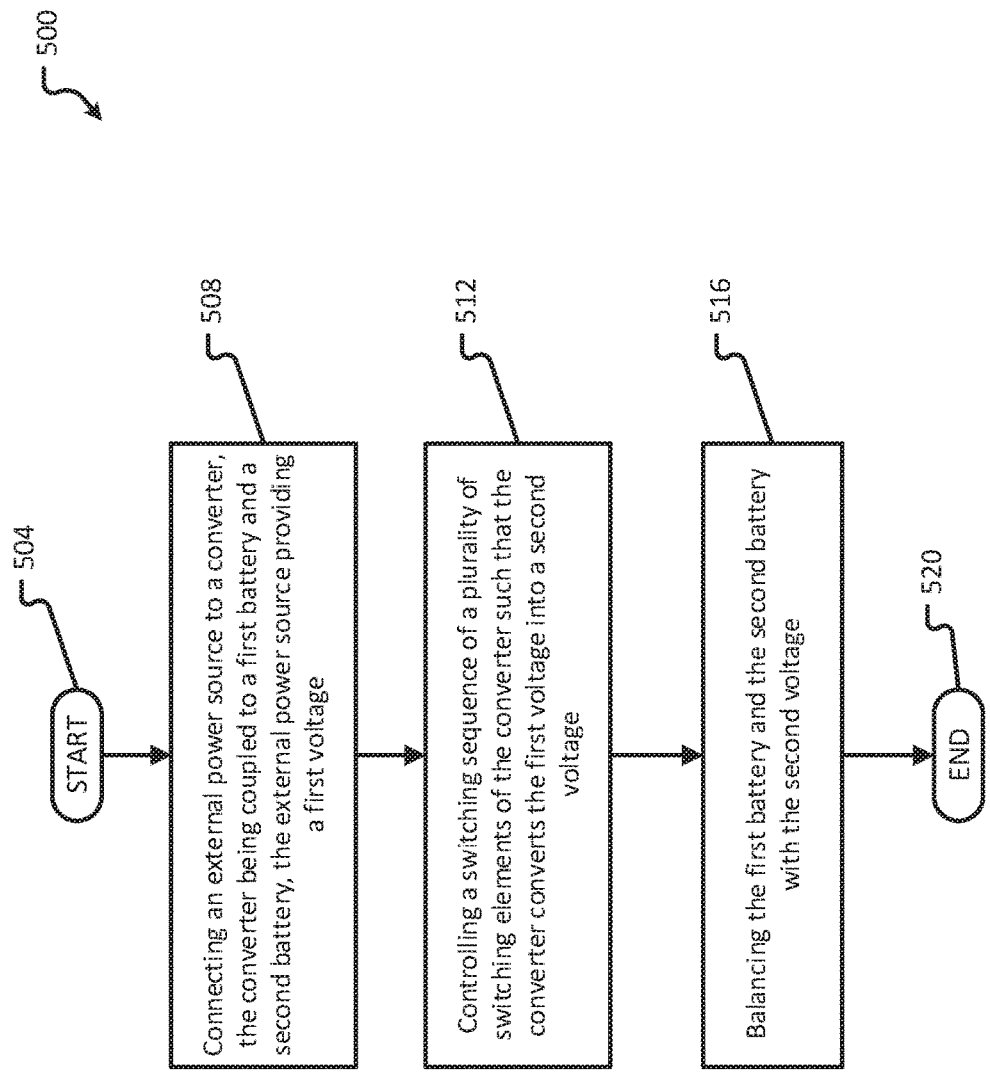
FIG. 5 is a flow diagram illustrating example operations of the system(s) in FIGS. 2-4 in accordance with at least one example embodiment.

FIG. 5 is a flow diagram illustrating example operations of the system(s) in FIGS. 2-4. In more detail, the operations of FIG. 5 are carried out to support auxiliary components 230, and balance the first battery 205 and the second battery 210.

While a general order for the steps of the method 500 is shown in FIG. 5, the method 500 can include more or fewer steps or can arrange the order of the steps differently than those shown in FIG. 5. Generally, the method 500 starts at operation 504 and ends at operation 520. The method 500 can be executed as a set of computer-executable instructions executed by the controller 220 and encoded or stored on a computer readable medium. Alternatively, the operations discussed with respect to FIG. 5 may be implemented by the various elements of the system(s) FIGS. 2-4. Hereinafter, the method 500 shall be explained with reference to the systems, components, assemblies, devices, user interfaces, environments, software, etc. described in conjunction with FIGS. 1-4.

In operation 508, the method 500 enters a charging mode by connecting an external power source 235 to a converter 215. The converter 215 has a switched capacitor topology (e.g., as in FIG. 3) and is coupled to a first battery 205 and a second battery 210 of an electric vehicle 100. As described above, the external power source 235 provides a first voltage (e.g., 800V).

In operation 512, the method 500 includes controlling a switching sequence of a plurality of switching elements 310, 315, 320, and 325 of the converter 215 such that the converter 215 converts the first voltage into a second voltage. Here, the second voltage may be less than the first voltage. For example, the second voltage may be 400V.

In operation 516, the method 500 includes charging the first battery 205 and the second battery 210, for example, with the first voltage while being balanced by the second voltage.

Figure 6:
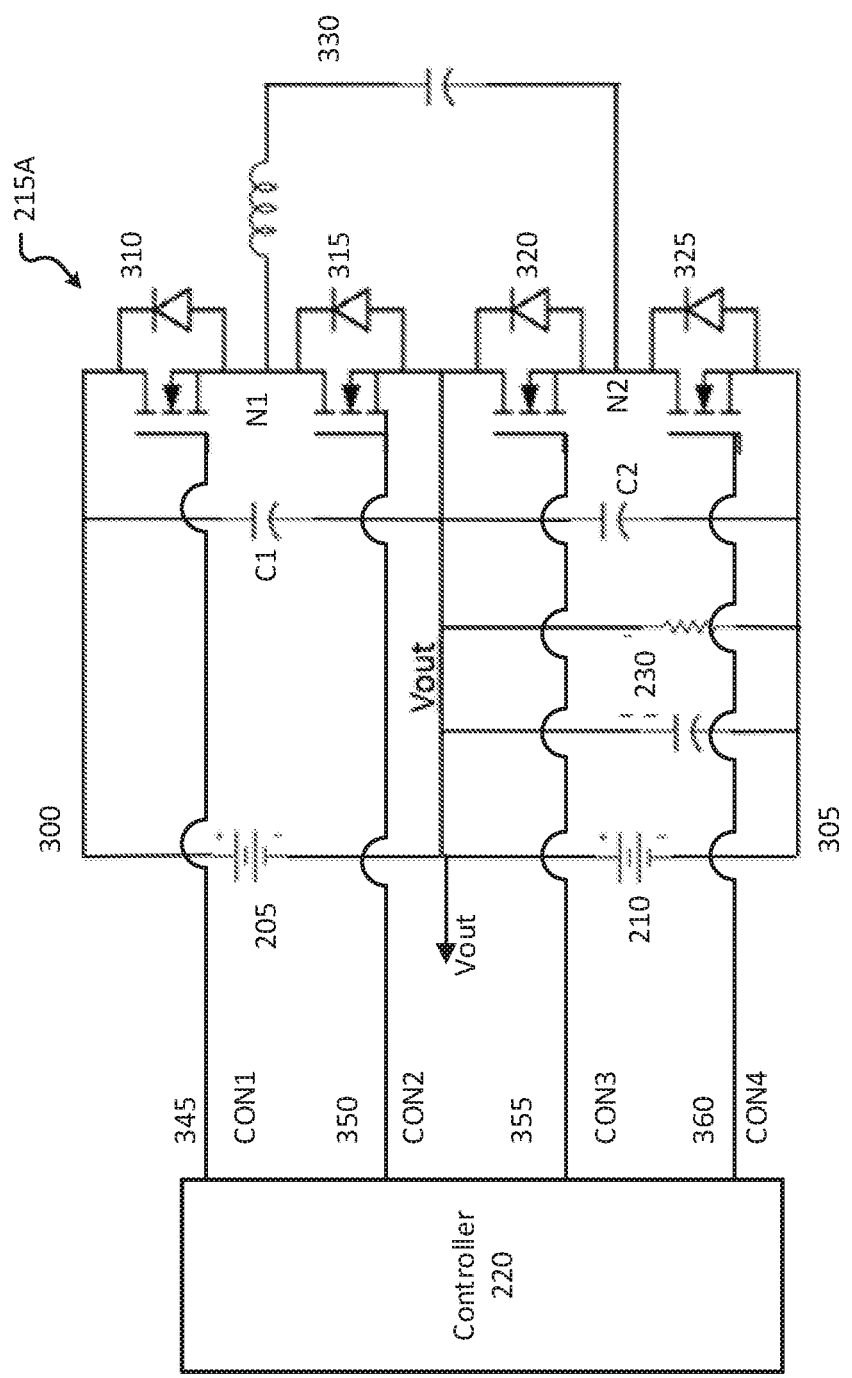
FIG. 6 illustrates another example of the converter of FIG. 2 according to at least one other example embodiment.

FIG. 6 illustrates a voltage converter (or converter) 215A according to at least one example embodiment.

The converter 215A may be referred to as having a switched capacitor topology and may have the same structure as the converter 215 in FIG. 3 except for each switching element is coupled to a separate control signal line. For example, the first switching element 310 is coupled to a first control signal line 345, the second switching element 315 is coupled to a second signal control line 350, the third switching element 320 is coupled to a third signal control line 355, and the fourth switching element 325 is coupled to a fourth signal control line 360. For example, if the switching elements are IGBTs, then gates of each IBGT may be coupled to a respective signal control line. Each of the first, second, third, and fourth signal control lines 345, 350, 355, and 360 receive first, second, third, and fourth control signals CON1 to CON4 (e.g., from the controller 220) to control switching of a respective switching element. For example, the first control signal CON1 controls switching of the first switching element 310 at a first switching frequency, the second control signal CON2 controls switching of the second switching element 315 at a second switching frequency, the third control signal CON3 controls switching of the third switching element 320 at a third switching frequency, and the fourth control signal CON4 controls switching of the fourth switching element 325 at a fourth switching frequency. Some or all of the switching elements 310 to 325 may have the same switching frequency or different switching frequencies, as desired.

Figure 7:
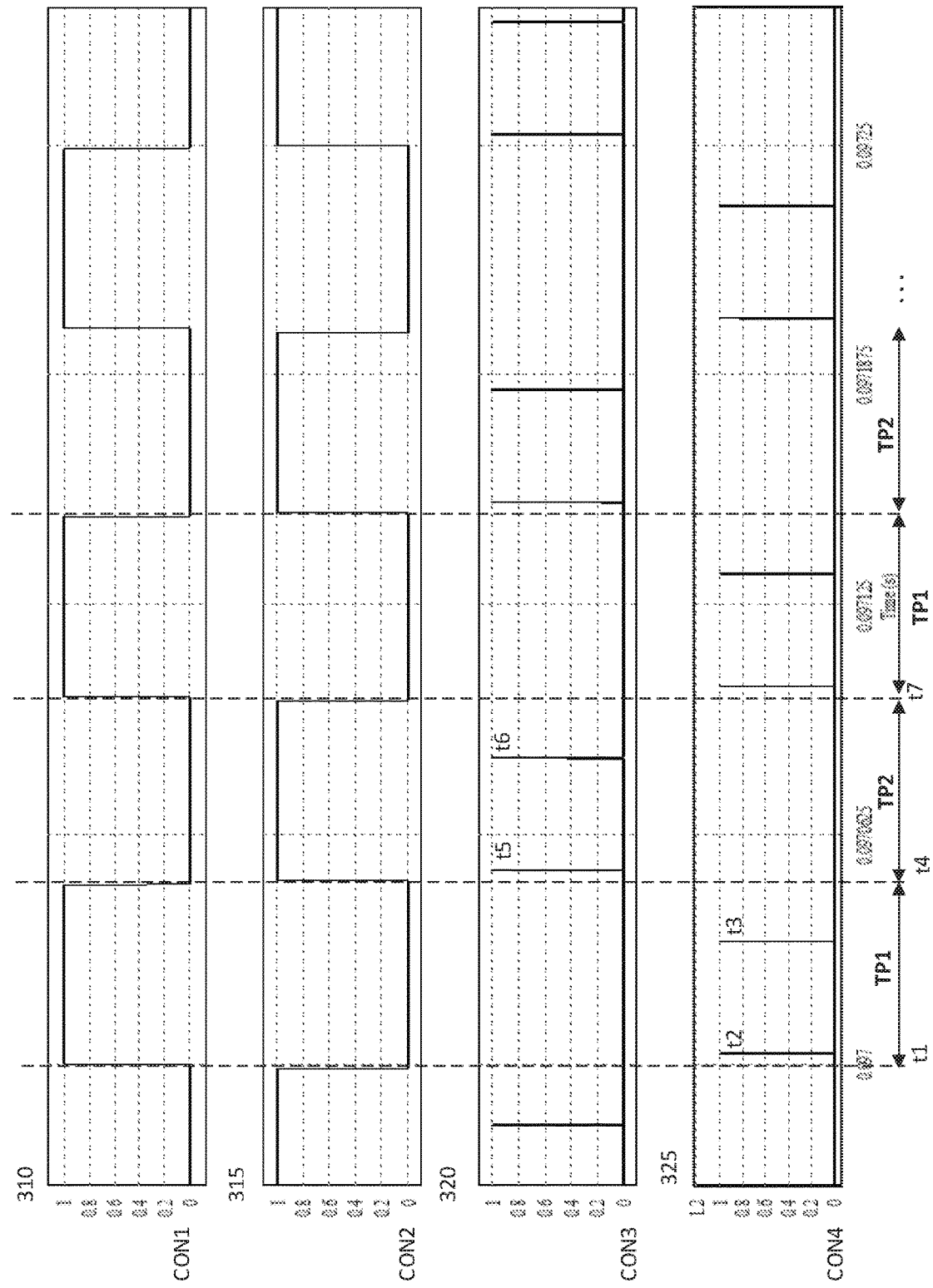
FIG. 7 illustrates an example timing diagram for controlling the converter of FIG. 6 according to at least one other example embodiment.

FIG. 7 illustrates a timing diagram for controlling the switching of the plurality of switching elements 310, 315, 320, and 325 in FIG. 6. In more detail, FIG. 7 illustrates ON/OFF states for the switching elements 310, 315, 320, and 325 in FIG. 6 according to at least one example embodiment.

At or before time t1, the vehicle 100 may enter charging mode in which the batteries 205/210 are charged with power from the external power source 235.

At time t1, the controller 220, via the first control signal CON1 through the first control signal line 345, turns ON switching element 310 for a first time period TP1. The controller 220, via the second control signal CON2 through the second control signal line 345 and the third control signal CON3 through the third control signal line 350, turns (or ensures that) switching elements 315 and 320 are OFF for the first time period TP1.

During time period TP1, the switching element 325 is pulsed ON and OFF at least once. For example, at time t2, the controller 220, via the fourth control signal CON4, pulses ON and OFF the switching element 325. Again, at time t3, the controller 220, via the fourth control signal CON4, pulses ON and OFF the switching element 325.

At time t4, the controller 220 supplies the first control signal CON1 to the first control signal line 345 to turn OFF the switching element 310 for a second time period TP2. Also, at time t4, the controller 220 supplies the second control signal CON2 to the second control signal line 350 to turn ON switching element 315 for the second time period TP2, and supplies the fourth control signal CON4 to ensure that the switching element 325 remains OFF for the second time period TP2. Here, it should be appreciated, that time periods TP1 and TP2 may have equal durations (e.g., about 50 microseconds per time period depending on the switching frequency, which is in turn determined by the resonant component value of the resonant circuit 330).

During time period TP2, the switching element 320 is pulsed ON and OFF at least once. For example, at time t5, the controller 220 supplies the third control signal CON3 to the third control signal line 355 to pulse the switching element 320 ON and OFF. Again, at time t6, the controller 220 supplies the third control signal CON3 to the third control signal line 355 to pulse the switching element 320 ON and OFF.

Here, it should be appreciated that the pulses at times t2, t3, t5, and t6 may have a desired duration of, for example, about 1 microsecond (or other desired value selected based on the resonant inductance value). In addition, as shown in FIG. 7, the time period TP1 and TP2 may continue to alternate for a desired duration (e.g., the duration of the charging operation). Further, the timing of the pulses at times t2, t3, t5, and t6 within the time periods TP1 and TP2 may vary according to design preferences. In at least one example embodiment, the timing of these pulses is based on a desired amount of inductor current through the inductor in the resonant circuit 330. For example, if the pulses at t2 and t3 (and at t5 and t6) are too close together, then the inductor current becomes undesirably large and/or unstable. On the other hand, if the pulses at t2 and t3 (and at t5 and t6) are too far apart, then the inductor current in the resonant circuit 330 becomes undesirably low. Accordingly, the timing of the pulses within the time periods TP1 and TP2 may be selected to as to achieve a desired inductor current through the inductor of the resonant circuit 330. The desired inductor current may be a design parameter set based on empirical evidence and/or preference.

It should be further appreciated that the time periods TP1 and TP2 as well as the number of pulses for switching elements 320 and/or 325 are not limited to the number and/or duration shown in FIG. 7 and may vary according to design preferences. Additionally, it should be understood that driving the converter 215A of FIG. 6 according to the timing diagram of FIG. 7 may produce a voltage Vout that is less than an input voltage on the power supply lines 300/305 (i.e., Vout is regulated). For example, the voltage Vout may have a value that is less than or greater than half of the of the input voltage, e.g., within about 5% of half of the input voltage. In other words, if the input voltage is 800V, then driving the converter 215A of FIG. 6 according to the timing shown in FIG. 7 may produce an output voltage Vout of between about 380-420V. The final value of the output voltage Vout within this range may depend upon the timing and number of pulses of the switching elements 320/325 during time periods TP1 and TP2 (e.g., pulses at times t2, t3, t5, and t6). Providing control or regulation of the value of Vout according to example embodiments allows for the BMS 203 to balance the voltages supplied to the batteries 205/210, for example, during a charging operation. Such voltage regulation of Vout may also be useful for driving auxiliary components of the vehicle 100, for example, auxiliary components that utilize less than the 400V output of the converter 215 in FIGS. 3 and 4.

In view of at least FIGS. 6 and 7, it should be understood that the controller 220 supplies the first, second, third, and fourth control signals CON1 to CON4 to 1) turn ON and OFF the first and second switching elements 310/315 such that i) the first switching element 310 is ON for a first time period TP1 while the second switching element 315 is OFF for the first time period TP1, and ii) the first switching element 310 is OFF for a second time period TP2 while the second switching 315 element is ON for the second time period TP2; to 2) pulse the third switching element 320 ON and OFF at least once during the second time period TP2; and 3) pulse the fourth switching 325 element ON and OFF at least once during the first time period TP1.

Figure 8:
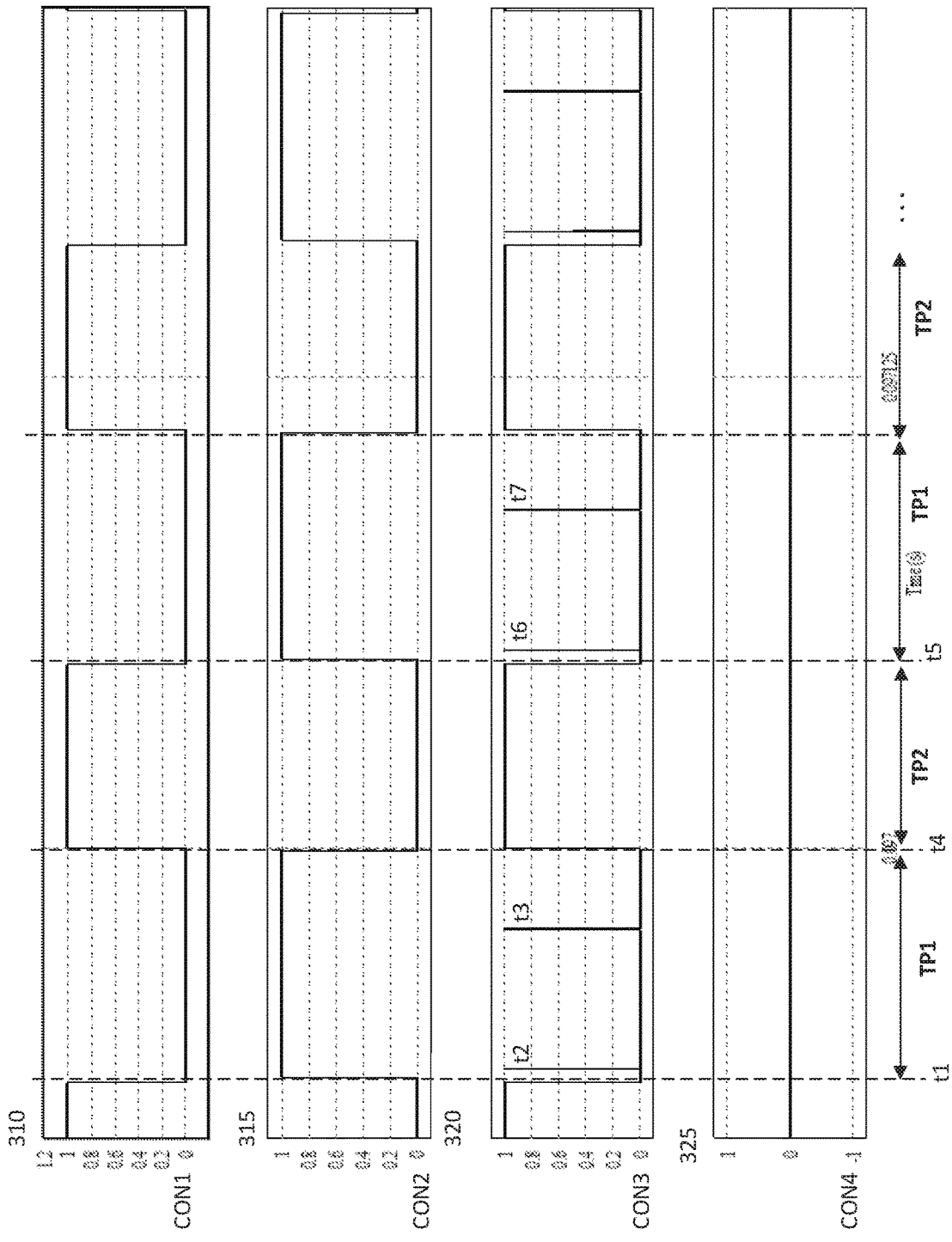
FIG. 8 illustrates an example timing diagram for controlling the converter of FIG. 6 according to at least one example embodiment.

FIG. 8 illustrates a timing diagram for controlling the switching of the plurality of switching elements 310, 315, 320, and 325 in FIG. 6 according to at least one example embodiment. In more detail, FIG. 8 illustrates ON/OFF states for the switching elements 310, 315, 320, and 325 in FIG. 6.

At time t1, the controller 220 supplies the first control signal CON1 to the first control signal line 345 to turn OFF the first switching element 310 for a first time period TP1. Also, at time t1, the controller 220 supplies the second control signal CON2 to the second control signal line 350 to turn ON the second switching element 315 for the first time period TP1. At time t1, the controller 220 supplies the fourth control signal CON4 to the fourth control signal line 360 to turn OFF the fourth switching element 325 (or ensure that switching element 325 remains OFF) for the first time period TP1.

During the first time period TP1, the third switching element 320 may be pulsed ON and OFF at least once. For example, at time t2, the controller 220 supplies the third control signal CON3 to the third control signal line 355 to pulse the third switching element 320 ON and OFF. Again, at time t3, the controller 220 supplies the third control signal CON3 to the third control signal line 355 to pulse the third switching element 320 ON and OFF.

At time t4, the controller 220 supplies the first control signal CON1 to the first control signal line 345 to turn ON the first switching element 310 for a second time period TP2, supplies the second control signal CON2 to the second control signal line 350 to turn OFF the second switching element 315 for the second time period TP2, and supplies the third control signal CON3 to the third control signal line 355 to turn ON the third switching element 320 for the second time period TP2. As shown, the controller 220 supplies the fourth control signal CON4 to the fourth control signal line 360 to ensure that the fourth switching element 325 remains OFF for the second time period TP2.

At time t5, the controller 220 returns to supplying control signals in accordance with time periods TP1 and TP2 described above, where TP1 includes times t6 and t7 for pulsing the third switching element 320. In other words, time periods TP1 and TP2 alternate.

Here, it should be appreciated that time period TP1 and TP2 in FIG. 8 may have different durations. For example, time period TP1 may be longer than time period TP2. For example, TP1 may have a duration of about 55 us and TP2 may have a duration of about 45 us.

Here, it should be appreciated that the pulses at times t2, t3, t6, and t7 in FIG. 8 may have a desired duration of, for example, about 1 microsecond (or other desired value selected based on the resonant inductance value). In addition, as shown in FIG. 8, the time period TP1 and TP2 may continue to alternate for a desired duration (e.g., the duration of the charging operation). Further, the timing of the pulses at times t2, t3, t6, and t7 within the time periods TP1 and TP2 may vary according to design preferences. In at least one example embodiment, the timing of these pulses is based on a desired amount of inductor current through the inductor in the resonant circuit 330. For example, if the pulses at t2 and t3 (and at t6 and t7) are too close together, then the inductor current becomes undesirably large and/or unstable. On the other hand, if the pulses at t2 and t3 (and at t6 and t7) are too far apart, then the inductor current in the resonant circuit 330 becomes undesirably low. Accordingly, the timing of the pulses are within the time periods TP1 and TP2 may be selected to as to achieve a desired inductor current through the inductor of the resonant circuit 330. The desired inductor current may be a design parameter set based on empirical evidence and/or preference.

It should be further appreciated that the time periods TP1 and TP2 as well as the number of pulses for switching elements 320 and/or 325 are not limited to the number and/or duration shown in FIG. 8 and may vary according to design preferences. Additionally, it should be understood that driving the converter 215A of FIG. 6 according to the timing diagram of FIG. 8 may produce a voltage Vout that is less than an input voltage on the power supply lines 300/305. For example, the voltage Vout may have a value that is less than or greater than half of the of the input voltage, e.g., within about 5% of half of the input voltage. In other words, if the input voltage is 800V, then driving the converter 215A of FIG. 6 according to the timing shown in FIG. 8 may produce an output voltage Vout of between about 380-420V. The final value of the output voltage Vout within this range may depend upon the timing and number of pulses of the switching elements 320/325 during time periods TP1 and TP2 (e.g., pulses at times t2, t3, t6, and t7). Providing control of the value of Vout according to example embodiments allows for the BMS 203 to balance the voltages supplied to the batteries 205/210, for example, during a charging operation. Such voltage regulation of Vout may also be useful for driving auxiliary components of the vehicle 100, for example, auxiliary components that utilize less than the 400V output of the converter 215 in FIGS. 3 and 4.

In view of FIGS. 6 and 8, it should be understood that example embodiments include the controller 220 supplying the first, second, third, and fourth control signals CON1 to CON4 to turn ON and OFF the first, second, and third switching elements 310/315/320/325 such that i) the first and third switching elements 310/320 are ON for a first time period TP1 while the second switching element 315 is OFF for the first time period TP1, ii) the first and third switching elements 310/320 are OFF for a second time period TP2 while the second switching element 315 is ON for the second time period TP2, iii) the third switching element 320 is pulsed ON and OFF at least once during the second time period TP2, and iv) the fourth switching element 325 is OFF for the first and second time periods TP1 and TP2.

By changing the control signals CON3 and CON4 in FIGS. 7 and 8 according to a desired output voltage and load conditions, the output voltage Vout of the converter 215A can be regulated.

Figure 9:
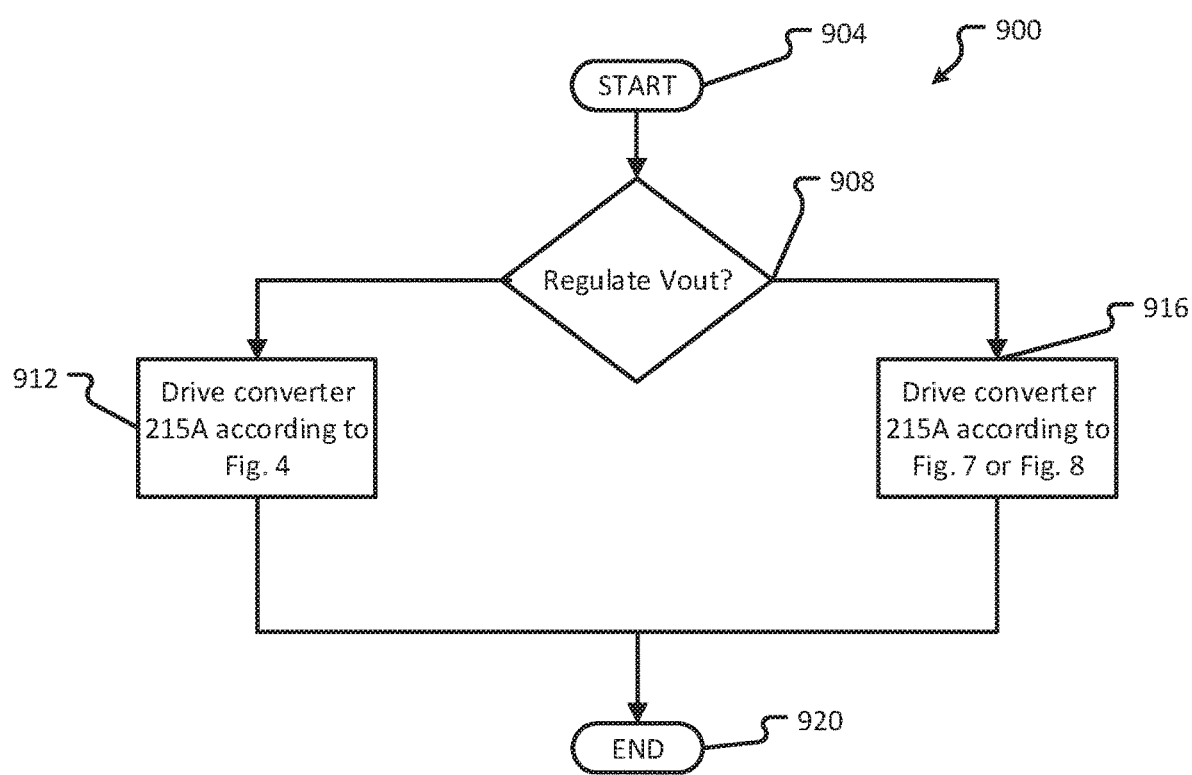
FIG. 9 is a flow diagram illustrating an example method relating to FIGS. 1-8 according to at least one other example embodiment.

FIG. 9 is a flow diagram illustrating an example method relating to FIGS. 1-8. In more detail, the operations of FIG. 9 are carried out to balance the first and second batteries 205/210 during charging and/or supply power to other components of the vehicle 100.

While a general order for the steps of the method 900 is shown in FIG. 9, the method 900 can include more or fewer steps or can arrange the order of the steps differently than those shown in FIG. 9. Generally, the method 900 starts at operation 904 and ends at operation 920. The method 900 can be executed as a set of computer-executable instructions executed by the controller 220 and encoded or stored on a computer readable medium. Additionally or alternatively, the operations discussed with respect to FIG. 9 may be implemented by the various elements of the system(s) FIGS. 1-8. Hereinafter, the method 900 shall be explained with reference to the systems, components, assemblies, devices, user interfaces, environments, software, etc. described in conjunction with FIGS. 1-8.

In operation 908, the method 900 determines whether to regulate the output voltage Vout of the converter 215A. If not, the method 900 proceeds to operation 912 and drives the converter 215A according to the timing diagram of FIG. 4 to output an unregulated voltage Vout (e.g., at about 400V). If so, the method 900 proceeds to operation 916 and drives the converter 215A according to the timing diagram of FIG. 7 or FIG. 8 to output a regulated voltage Vout (e.g., at a desired value between 380V-400V).

Operation 908 may include the controller 220 determining a target voltage to which each battery 205/210 should be charged, and determining whether Vout should be regulated based on the target voltages. Here, the controller 220 may determine the target voltage by estimating (e.g., based on known battery properties and/or statistics) and/or measuring a maximum voltage to which the batteries 205/210 can be charged. For example, the maximum voltage to which the batteries 205/210 can be charged may change over time (e.g., become lower) as the batteries 205/210 deteriorate due to age, use, etc. Thus, the target voltage for each battery 205/210 may also change (e.g., become lower) over time. If the controller 220 determines that the target voltage is a voltage that less than the value of Vout output by driving the converter 215A according to FIG. 4, then the controller may determine to regulate Vout in accordance with FIG. 7 or 8. At least one other example for operation 908 includes the controller 220 determining whether Vout is desired for supplying power to one or more auxiliary components of the vehicle 100 that operate at a voltage that is less than or greater than, for example, 400V. If not, the controller 220 drives the converter 215A according to FIG. 4, and if so, then the controller 220 may drive the converter 215A according to FIGS. 7 and/or 8.

In view of the foregoing description, it should be appreciated that the timing diagram of FIG. 4 and method of FIG. 5 may also apply to the converter 215A in FIG. 6. That is, the controller 220 may control the converter 215A may carry out the timing diagram of FIG. 4 and method of FIG. 5 if desired. It should also be understood that the controller 220 may control the converter 215A according to one or more of the timing diagrams in FIGS. 4, 7, and 8 according charging/power supply preferences for the batteries 205/210 and/or auxiliary components of the vehicle 100.

In view of the foregoing description, it should be understood that the converters 215 and 215A of FIGS. 3 and 6 may each include additional switching circuitry (not shown) between Vout and each battery 205/210 (e.g., a switch, such as a transistor having a gate connected to the controller, is provided between Vout and the positive terminal of each battery) in order to allow the controller 220 to individually charge the batteries 205/210 if desired. For example, if the controller 220 determines that battery 205 is fully charged but battery 210 is not yet fully charged, the controller 220 may control the switching circuitry to cut off power supply to the battery 205 and to continue charging battery 210. The additional switching circuitry may also be used to provide different regulated values of Vout to charge each battery 205/210.

Figure 10:
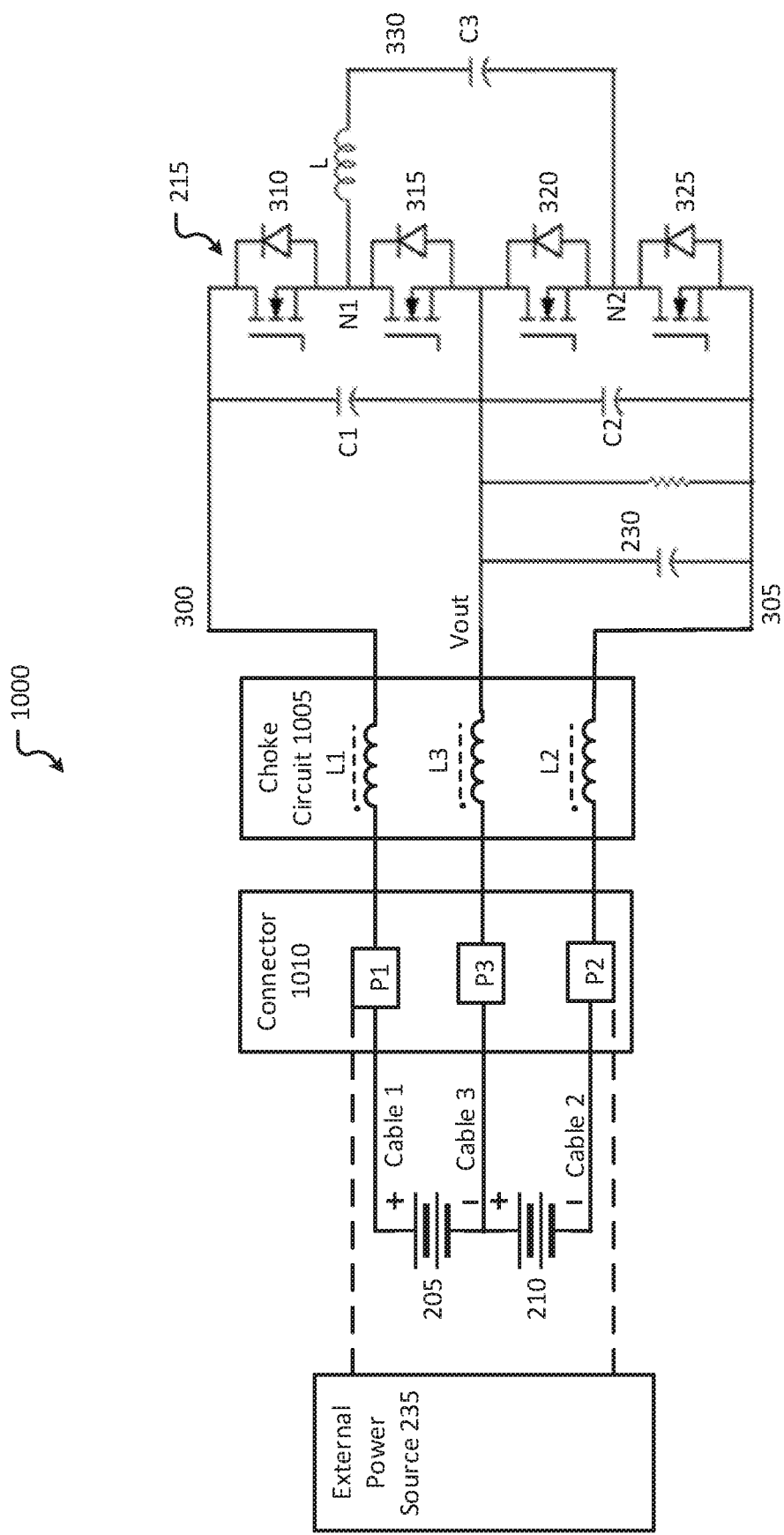
FIG. 10 illustrates an example system including a converter and a three port connector according to at least one example embodiment.

FIG. 10 illustrates an example system 1000 including a converter 215 and a connector according to at least one example embodiment. The converter 215 may have a same or similar structure as the converter 215 from FIG. 3 or 215A in FIG. 6. As may be appreciated, the controller 220 and control signal lines 335/340 or control lines 345/350/355/360 that connect the controller 220 to switches 310, 315, 320, 325 are not shown in FIG. 10 for convenience of illustration of other elements in FIG. 10.

The system 1000 further includes a choke circuit 1005, a connector 1010, and Cables 1, 2, and 3. The choke circuit 1005 includes three inductances L1, L2, L3, and the connector 1010 includes three ports, P1, P2, P3. Here, it should be understood that the choke circuit 1005, the connector 1010, and/or the Cables 1, 2, 3 may be separate from or integrated into the converter 215 according to design preferences.

As shown in FIG. 10, the choke circuit 1005 includes three inductances, L1, L2, L3, and the connector 1010 includes three ports, P1, P2, P3. The first inductance L1 is coupled between the first port P1 and power signal line 300. The second inductance L2 is coupled between the second port P2 and power signal line 305. The third inductance L3 is coupled between the output line Vout and the third port P3. As noted above, the output line Vout outputs the second voltage (e.g., 400V) to support auxiliary components 230, and to balance the first battery 205 and the second battery 210.

As shown in FIG. 10, the first battery 205 is coupled between the first port P1 and the third port P3 of the connector 1010 via Cable 1 and Cable 3, where Cable 1 is coupled to the positive terminal of the first battery 205 and Cable 3 is coupled to the negative terminal of the first battery 205. The second battery 210 is coupled between the third port P3 and the second port P2 of the connector 1010 via Cable 3 and Cable 2, where Cable 3 is coupled to the positive terminal of the second battery 210 and Cable 2 is coupled to the negative terminal of the second battery 210. As shown in FIG. 10, Cable 3 is coupled to both the negative terminal of the first battery 205 and the positive terminal of the second battery 210, and to the third port P3 of the connector 1010. The Cables 1, 2, and 3 may be integrated into one or more cable harnesses, as desired.

As further shown by the dashed lines, the external power source 235 may be connectable to ports P1 and P2, for example, during a charging operation in which the batteries 205/210 are charged. Accordingly, the connector 1010 may comprise any known port structure for charging vehicles with DC voltages (e.g., ports of a J1772-2009 connector, ports of a CHAdeMO connector, etc.). Additionally or alternatively, the connector 1010 may include other suitable port structures for connecting to the external power source 235. Additionally or alternatively, the external power source 235 may be connectable to power signal lines 300/305 through a connector (not shown) separate from the connector 1010.

The choke circuit 1005 may be a three-inductance choke circuit. For example, the choke circuit 1005 may be a three inductance common mode choke circuit. The choke circuit 1005 may filter out common mode noise. For example, the choke circuit 1005 may suppress electromagnetic interference (e.g., radio frequency interference) on the signal lines connected to the choke circuit 1005. The choke circuit 1005 may be a common mode choke in that the inductances L1, L2, L3 are coils wound around different portions of a same core. The core may include ferrite, air, iron, cobalt, nickel, permalloy, sendust, iron carbonyl, another suitable core material, or a combination thereof. The core may take on any desired shape, for example, a ring shape, a cylinder shape, etc. The number of turns for each coil may be a design parameter set based on empirical evidence and/or preference. The coils may comprise a conductive material, such as copper. Inductance L3 of the choke circuit 1005 and Cable 3 may each have a current rating of about double an anticipated input current from external power source 235 so that the inductance L3 and Cable 3 can accommodate the output current used to support auxiliary components 230, and to balance the first battery 205 and the second battery 210. The inductances L1 and L2 and Cables 1 and 2 may each have a current rating to accommodate the anticipated input current from external power source 235. Alternatively, the current rating for inductances L1/L2 and/or Cable 1 and Cable 2 may be the same as the current rating of L3 and Cable 3. In at least one example embodiment, Vin is 800V and Vout is 400V; therefore, the current rating for Cable 3 and inductance L3 is about twice that of the current rating for inductances L1 and L2 and Cables 1 and 2.

The connector 1010 may include three ports. In at least one example embodiment, the connector 1010 is a three-port high voltage (HV) connector where the three ports are integrated into a same connector structure. In at least one example embodiment, the three ports may be part of a connector with more than three ports. Additionally or alternatively, the connector 1010 may be separated into two or more connectors (e.g., three connectors with one port each or two connectors where one connector has two ports and the other connector has one port).

Here, it should be appreciated that the design in FIG. 10 may reduce cost and system footprint by using fewer high voltage components (connector ports, cables, etc.) and/or may improve the power density of topologies for electric vehicle charging.

In view of the foregoing description, it should be appreciated that example embodiments allow the BMS 203 to balance the batteries 205/210 by supplying separate desired charging voltages to each battery 205/210, which can improve the life and/or performance of the batteries 205/210 by avoiding battery damage due to overcharge and/or by ensuring that each battery is charged to its desired target voltage. Such advantages are possible as a result of the additional switching circuitry between Vout and each battery 205/210 in combination with the option to regulate Vout if desired.

In view of the foregoing description, it should be appreciated that one or more example embodiments provide a power/charging system(s) for an electric vehicle that has dual battery packs and a converter configuration that allows for fast charging. Example embodiments may also provide automatic balancing of the battery packs during charging regardless of which battery pack is loaded with the powertrain/auxiliary components. Further, example embodiments may reduce cost and footprint of the power system as well as the overall weight of the vehicle (e.g., by using a light weight converter).

Although example embodiments have been discussed with reference to specific voltage/current values, it should be understood that example embodiments are not limited thereto. For example, example embodiments may also be applied to vehicle systems that charge/operate at different voltages/currents than those specifically referenced herein.

Example embodiments include a converter including a plurality of switching elements connected in series and coupled between power signal lines that receive a first voltage from an external power source. The converter includes at least one capacitance coupled between the power signal lines and coupled to the plurality of switching elements, a first battery, and a second battery. The converter includes at least one connector including a first port coupled to the first battery and a first power signal line of the power signal lines, a second port coupled to the second battery and a second power signal line of the power signal lines, and a third port coupled to an output line. The output line is coupled to the first battery and the second battery. The converter includes a resonant circuit coupled to the plurality of switching elements. A switching frequency of the plurality of switching elements is matched to a resonant frequency of the resonant circuit such that, during a charging mode, the plurality of switching elements, the resonant circuit and the at least one capacitance operate to convert the first voltage into a second voltage that balances voltages the first battery and the second battery through the first, second, and third ports.

Aspects of example embodiments include that the at least one capacitance further comprises a first capacitance and a second capacitance. The plurality of switching elements includes a first switching element and a second switching element connected in parallel with the first capacitance. The plurality of switching elements includes a third switching element and fourth switching element connected in parallel with the second capacitance.

Aspects of example embodiments include that the plurality of switching elements include insulated gate bipolar transistors (IGBTs) or power metal-oxide-semiconductor field effect transistors (MOSFETs).

Aspects of example embodiments include that the resonant circuit is coupled between a first node and a second node, where the first node is between the first switching element and the second switching element, and where the second node is between the third switching element and the fourth switching element.

Aspects of example embodiments include a choke circuit coupled between the first, second, and third ports and the output line, and the first and second power signal lines.

Aspects of example embodiments include that the choke circuit is a three-inductance choke circuit.

Aspects of example embodiments include that the choke circuit comprises a first inductance coupled between the first power signal line and the first port, a second inductance coupled between the second power signal line and the second port, and a third inductance coupled between the output line and the third port.

Aspects of example embodiments include that the first, second, and third inductances are coils wound around a same core.

Example embodiment include a power system for an electric vehicle. The power system includes a first battery, a second battery, and a converter. The converter includes a plurality of switching elements connected in series and coupled between power signal lines that receive a first voltage from an external power source, and at least one capacitance coupled between the power signal lines and coupled to the plurality of switching elements, the first battery and the second battery. The converter includes a resonant circuit coupled to the plurality of switching elements, where the resonant circuit has a resonant frequency. The converter includes an output line coupled to the plurality of switching elements and the first and second batteries. The power system includes a connector including a first port coupled to the first battery and a first power signal line of the power signal lines, a second port coupled to the second battery and a second power signal line of the power signal lines, and a third port coupled to the output line. The power system includes a controller to control a switching frequency of the plurality of switching elements to match the resonant frequency such that the converter converts the first voltage into a second voltage to balance voltages of the first battery and the second battery through the first, second, and third ports.

Aspects of example embodiments include that the power system further comprises a choke circuit coupled between the connector and the converter.

Aspects of example embodiments include that the choke circuit comprises a first inductance coupled between the first power signal line and the first port, a second inductance coupled between the second power signal line and the second port, and a third inductance coupled between the output line and the third port.

Aspects of example embodiments include that the power system comprises a first cable coupled to the first port and a first terminal of the first battery, a second cable coupled to the second port and a first terminal of the second battery, and a third cable coupled to the third port and second terminals of the first and second battery.

Aspects of example embodiments include that the first cable and the second cable have a same, first current rating and the third cable has a second current rating that is different from the first current rating.

Aspects of example embodiments include that the second current rating is about double an input current provided by the external power source.

Aspects of example embodiments include that the plurality of switching elements further comprises a first switching element, a second switching element, a third switching element, and a fourth switching element. The first and second switching elements are coupled between the first power signal line and the output line, and the third and fourth switching elements are coupled between the output line and the second power signal line. The at least one capacitance further comprises a first capacitance coupled between the first power signal line and the output line so as to be in parallel with the first and second switching elements, and a second capacitance coupled between the second power signal line and the output line so as to be in parallel with the third and fourth switching elements.

Aspects of example embodiments include that when the switching frequency does not match the resonant frequency, the controller adjusts the switching frequency based on feedback from the converter.

Aspects of example embodiments include that the first voltage is 800V and the second voltage is 400V.

Example embodiments include a device including a plurality of switching elements connected in series and coupled between first and second power signal lines that receive a first voltage from an external power source, and at least one capacitance coupled between the power signal lines and coupled to the plurality of switching elements, a first battery, and a second battery. The device includes a three port connector coupled to the power signals lines, an output line, the first battery, and the second battery. The device includes a resonant circuit coupled to the plurality of switching elements. The plurality of switching elements are controllable such that, during a charging mode, the plurality of switching elements, the resonant circuit, and the at least one capacitance operate to convert the first voltage into a second voltage that balances voltages of the first battery and the second battery through the three port connector.

Aspects of example embodiments include that the device further comprises a common mode choke circuit coupled between the three-port connector and the output line, and the first and second power signal lines.

Aspects of example embodiments include that the device further comprises a first cable coupled to a first port of the three port connector and a first terminal of the first battery, a second cable coupled to a second port of the three port connector and a first terminal of the second battery, and a third cable coupled to a third port of the three port connector and second terminals of the first and second battery, wherein a current rating of the third cable is about double current ratings of the first cable and the second cable.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized.

The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A converter, comprising:
a plurality of switching elements connected in series and coupled between power signal lines that receive a first voltage from an external power source;
at least one capacitance coupled between the power signal lines and coupled to the plurality of switching elements;
at least one connector including:
a first port that couples to a first battery and a first power signal line of the power signal lines;
a second port that couples to a second battery and a second power signal line of the power signal lines;
a third port coupled to an output line, the output line coupling to the first battery and the second battery; and
a resonant circuit coupled to the plurality of switching elements, a switching frequency of the plurality of switching elements being matched to a resonant frequency of the resonant circuit such that, during a charging mode that charges the first battery and the second battery, the plurality of switching elements, the resonant circuit and the at least one capacitance operate to convert the first voltage into a second voltage that is lower than the first voltage and that balances voltages of the first battery and the second battery through the first, second, and third ports.

2. The converter of claim 1, wherein the at least one capacitance further comprises:

a first capacitance, wherein the plurality of switching elements includes a first switching element and a second switching element connected in parallel with the first capacitance; and
a second capacitance, wherein the plurality of switching elements includes a third switching element and fourth switching element connected in parallel with the second capacitance.

3. The converter of claim 2, wherein the plurality of switching elements include insulated gate bipolar transistors (IGBTs) or power metal-oxide-semiconductor field effect transistors (MOSFETs).

4. The converter of claim 2, wherein the resonant circuit is coupled between a first node and a second node, wherein the first node is between the first switching element and the second switching element, wherein the second node is between the third switching element and the fourth switching element.

5. The converter of claim 1, further comprising:
a choke circuit coupled between the first, second, and third ports and the output line, and the first and second power signal lines.

6. The converter of claim 5, wherein the choke circuit is a three-inductance choke circuit.

7. The converter of claim 6, wherein the choke circuit comprises:
a first inductance coupled between the first power signal line and the first port;
a second inductance coupled between the second power signal line and the second port; and
a third inductance coupled between the output line and the third port.

8. The converter of claim 7, wherein the first, second, and third inductances are coils wound around a same core.

9. A power system for an electric vehicle, comprising:
a first battery;
a second battery;
a converter including:
a plurality of switching elements connected in series and coupled between power signal lines that receive a first voltage from an external power source;
at least one capacitance coupled between the power signal lines and coupled to the plurality of switching elements, the first battery, and the second battery;
a resonant circuit coupled to the plurality of switching elements, the resonant circuit having a resonant frequency; and
an output line coupled to the plurality of switching elements and the first and second batteries;
a connector including:
a first port coupled to the first battery and a first power signal line of the power signal lines;
a second port coupled to the second battery and a second power signal line of the power signal lines;
a third port coupled to the output line; and
a controller to control a switching frequency of the plurality of switching elements to match the resonant frequency such that, during a charging mode that charges the first battery and the second battery, the converter converts the first voltage into a second voltage that is lower than the first voltage to balance voltages of the first battery and the second battery through the first, second, and third ports.

10. The power system of claim 9, further comprising:
a choke circuit coupled between the connector and the converter.

11. The power system of claim 10, wherein the choke circuit comprises:
a first inductance coupled between the first power signal line and the first port;
a second inductance coupled between the second power signal line and the second port; and
a third inductance coupled between the output line and the third port.

12. The power system of claim 9, further comprising:
a first cable coupled to the first port and a first terminal of the first battery;
a second cable coupled to the second port and a first terminal of the second battery; and
a third cable coupled to the third port and second terminals of the first and second battery.

13. The power system of claim 12, wherein the first cable and the second cable have a same, first current rating and the third cable has a second current rating that is different from the first current rating.

14. The power system of claim 13, wherein the second current rating is about double an input current provided by the external power source.

15. The power system of claim 9, wherein the plurality of switching elements further comprises:
a first switching element;
a second switching element;
a third switching element; and
a fourth switching element, wherein the first and second switching elements are coupled between the first power signal line and the output line, and wherein the third and fourth switching elements are coupled between the output line and the second power signal line; and
wherein the at least one capacitance further comprises:
a first capacitance coupled between the first power signal line and the output line so as to be in parallel with the first and second switching elements; and
a second capacitance coupled between the second power signal line and the output line so as to be in parallel with the third and fourth switching elements.

16. The power system of claim 9, wherein, when the switching frequency does not match the resonant frequency, the controller adjusts the switching frequency based on feedback from the converter.

17. The power system of claim 9, wherein the first voltage is 800V and the second voltage is 400V.

18. A device, comprising:
a plurality of switching elements connected in series and coupled between first and second power signal lines that receive a first voltage from an external power source;
at least one capacitance coupled between the first and second power signal lines and coupled to the plurality of switching elements, a first terminal that connects to a first battery, and a second terminal that connects to a second battery;
a three port connector coupled to the first and second power signals lines, an output line, the first terminal, and the second terminal; and
a resonant circuit coupled to the plurality of switching elements, the plurality of switching elements being controllable such that, during a charging mode that charges the first battery and the second battery, the plurality of switching elements, the resonant circuit, and the at least one capacitance operate to convert the first voltage into a second voltage that is lower than the first voltage and that balances voltages of the first battery and the second battery through the three port connector.

19. The device of claim 18, further comprising:
a common mode choke circuit coupled between the three port connector and the output line, and the first and second power signal lines.

20. The device of claim 18, further comprising:
a first cable coupled to a first port of the three port connector and the first terminal;
a second cable coupled to a second port of the three port connector and the second terminal; and
a third cable coupled to a third port of the three port connector and a third terminal that connects to the first battery and the second battery, wherein a current rating of the third cable is about double current ratings of the first cable and the second cable.

\* \* \* \* \*